(12) United States Patent
Flora et al.

(10) Patent No.: US 8,908,167 B2
(45) Date of Patent: Dec. 9, 2014

(54) FIBER OPTIC CONNECTOR INSPECTION MICROSCOPE WITH INTEGRAL OPTICAL POWER MEASUREMENT

(75) Inventors: Dennis Flora, Penacook, NH (US); Christopher Theberge, Concord, NH (US)

(73) Assignee: AFL Telecommunications LLC, Spartanburg, SC (US)

( * ) Notice: Subject to any disclaimer, the term of this patent is extended or adjusted under 35 U.S.C. 154(b) by 0 days.

(21) Appl. No.: 13/318,443

(22) PCT Filed: May 5, 2011

(86) PCT No.: PCT/US2011/035375
§ 371 (c)(1),
(2), (4) Date: Nov. 1, 2011

(87) PCT Pub. No.: WO2011/140352
PCT Pub. Date: Nov. 10, 2011

(65) Prior Publication Data
US 2013/0038864 A1    Feb. 14, 2013

Related U.S. Application Data

(60) Provisional application No. 61/331,443, filed on May 5, 2010.

(51) Int. Cl.
*G01N 21/00* (2006.01)
*G02B 21/00* (2006.01)

(52) U.S. Cl.
CPC .................................. *G02B 21/0016* (2013.01)
USPC ....... 356/73.1; 356/73; 356/237.1; 356/237.2

(58) Field of Classification Search
None
See application file for complete search history.

(56) References Cited

U.S. PATENT DOCUMENTS

| | | | |
|---|---|---|---|
| 4,639,130 A * | 1/1987 | Koike et al. | 356/73.1 |
| 4,803,497 A | 2/1989 | Kennedy, Jr. et al. | |
| 5,122,648 A | 6/1992 | Cohen et al. | |
| 5,127,725 A * | 7/1992 | Mueller et al. | 356/73.1 |
| 5,305,759 A | 4/1994 | Kaneko et al. | |
| 5,432,330 A | 7/1995 | Nakamura | |
| 5,512,490 A * | 4/1996 | Walt et al. | 436/171 |
| 5,764,363 A | 6/1998 | Ooki et al. | |

(Continued)

FOREIGN PATENT DOCUMENTS

JP    07104147 A  *  4/1995

OTHER PUBLICATIONS

Machine translation of JP 07104147 A to Kimura et al. published Apr. 21, 1995. pp. 1-5.*

(Continued)

*Primary Examiner* — Gordon J Stock, Jr.
(74) *Attorney, Agent, or Firm* — Sughrue Mion, PLLC

(57) ABSTRACT

A fiber optic inspection microscope including an objective lens, an optical detector, an image detector, an illumination source, and first and second beamsplitters, wherein the first beamsplitter is in a first optical path between the objective lens, the image detector and the optical detector, wherein the first beamsplitter allows passage of an optical image to the image detector, wherein the first beamsplitter directs optical energy to the optical detector, wherein the second beamsplitter is in a second optical path between the illumination source and the objective lens, and wherein the second beamsplitter directs light from the illumination source to the objective lens.

5 Claims, 3 Drawing Sheets

(56) References Cited

U.S. PATENT DOCUMENTS

| | | | |
|---|---|---|---|
| 5,841,139 A | 11/1998 | Sostek et al. | |
| 6,169,289 B1 | 1/2001 | White et al. | |
| 6,482,593 B2 * | 11/2002 | Walt et al. | 506/17 |
| 6,809,866 B2 * | 10/2004 | Xie et al. | 359/618 |
| 7,015,444 B2 * | 3/2006 | Kawano et al. | 250/201.3 |
| 7,173,245 B2 * | 2/2007 | Shakouri et al. | 250/339.11 |
| 7,417,735 B2 * | 8/2008 | Cummings et al. | 356/408 |
| 2006/0078264 A1 * | 4/2006 | Lauzier et al. | 385/134 |
| 2007/0177149 A1 * | 8/2007 | Aronkyto et al. | 356/417 |
| 2008/0278709 A1 * | 11/2008 | Lu | 356/72 |
| 2010/0295938 A1 * | 11/2010 | Hahn et al. | 348/126 |
| 2012/0206727 A1 * | 8/2012 | Schulte et al. | 356/402 |

OTHER PUBLICATIONS

International Search Report of PCT/US2011/035375 dated Aug. 2, 2011.

* cited by examiner

FIBER OPTIC CONNECTOR INSPECTION MICROSCOPE WITH INTEGRAL OPTICAL POWER MEASUREMENT

CROSS-REFERENCE TO RELATED APPLICATIONS

This application is based upon and claims the benefit of priority from U.S. Provisional Application No. 61/331,443, filed May 5, 2010 in the United States Patent and Trademark Office, the disclosure of which is incorporated herein in its entirety by reference.

BACKGROUND

1. Field

The invention is related to a fiber optic connector inspection microscope which integrates optical power measurement into the same optical path.

2. Related Art

Fiber optic inspection microscopes have been available for over a decade. Examples of such inspection microscopes include the following: JDSU FBP-SM05, Noyes VFS2 and Exfo FIP-400D. More recent variations include the combination of a separate optical power meter in the same package but with a separate test port for optical power measurement. Examples of such inspection microscopes include the JDSU HP2 Series. Recent variations also include the provision of dual inspection methods including one built in microscope for connector end inspection and a second port which accommodates a probe style microscope commonly used to inspect connector ends, bulkheads and adapters common in the industry. Examples of such an inspection microscopes includes the JDSU HP2 Series Option.

However, there is a need for microscopes that reduce the handling (and potential for contamination) of the fiber optic connector. As a result, an objective of the invention is to provide an optical inspection microscope that integrates optical power measurement into the same optical path. An application for such a microscope would be for inspecting optical fiber patch panels. The microscope would be able to indicate that power is present on a fiber that was thought to be dark (i.e. disabled and without traffic). This would indicate that corrective action is need by the user as an optical fiber service may have been interrupted. Another application could be a quick test of optical power present on connectors at the time of new equipment deployment. This application would provide a power indication without introducing the additional handling steps required by current products.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

A first embodiment of the fiber optic inspection microscope includes an objective lens, an optical detector, an image detector, an illumination source, and first and second beamsplitters, wherein the first beamsplitter is in a first optical path between the objective lens, the image detector and the optical detector, wherein the first beamsplitter allows passage of an optical image to the image detector, wherein the first beamsplitter directs optical energy to the optical detector, wherein the second beamsplitter is in a second optical path between the illumination source and the objective lens, and wherein the second beamsplitter directs light from the illumination source to the objective lens.

Another feature of the first embodiment of the fiber optic microscope includes optical power measurement circuitry connected to the photodetector.

A second embodiment of the fiber optic inspection microscope includes an objective lens, an optical detector, an image detector, an illumination source, a movable mirror, and a beamsplitter, wherein the movable mirror is configured to be moved into and out of a first optical path between the objective lens, the image detector and the optical detector, wherein the movable mirror, when it is out of the first optical path, allows passage of an optical image to the image detector, wherein the movable mirror, when it is in the first optical path, directs optical energy to the optical detector, wherein the beamsplitter is in a second optical path between the illumination source and the objective lens, and wherein the beamsplitter directs light from the illumination source to the objective lens.

Another feature of the second embodiment of the fiber optic microscope includes optical power measurement circuitry connected to the photodetector.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings.

Figure 1:
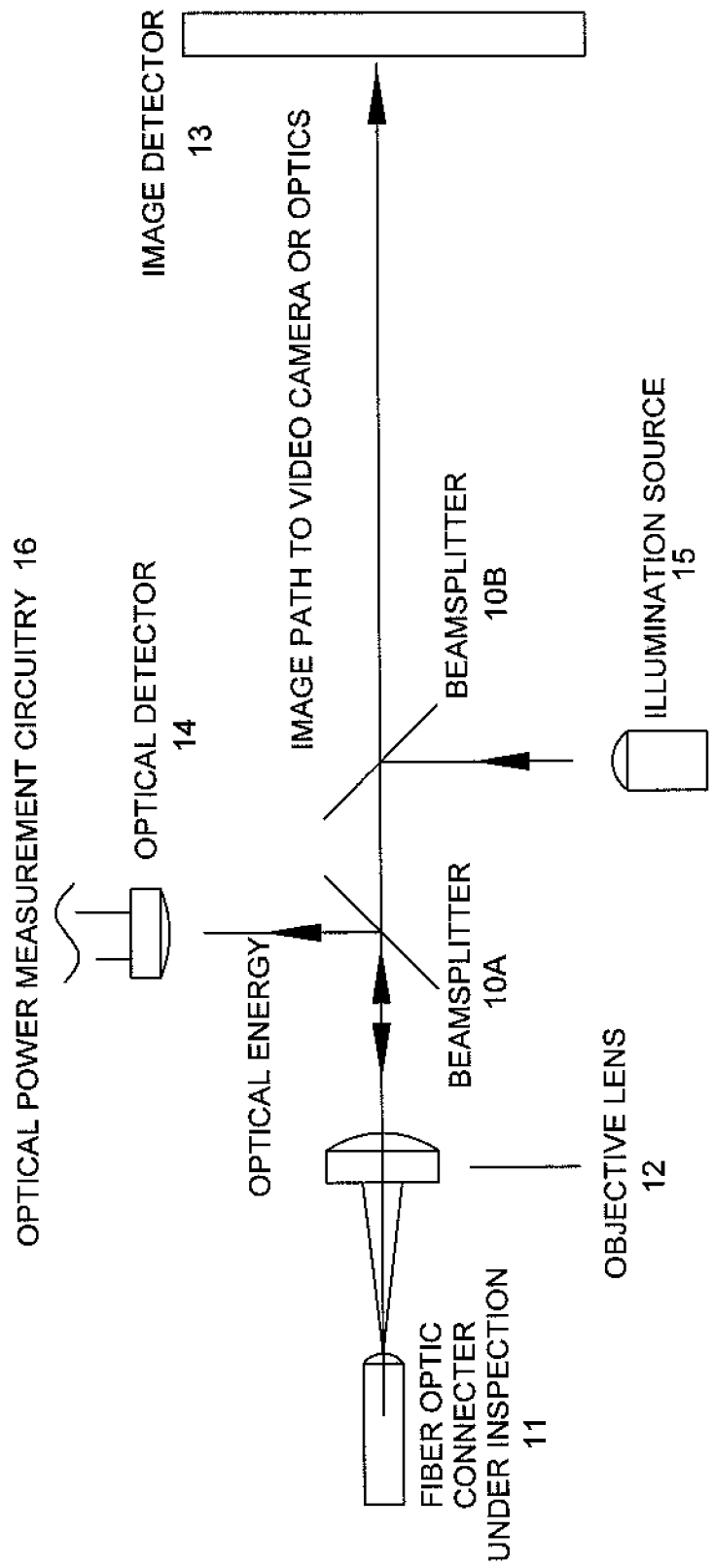
FIG. 1 is a schematic representation of an embodiment of the invention.

FIG. 1 illustrates one possible configuration of a fiber optic inspection microscope with integral power measurement capability. The invention includes an optical beam separation element, such as a beamsplitter 10A. An optical image on an optical path from the fiber optic connector 11 under inspection, through the objective lens 12 of the microscope and back to an image sensor 13 (such as an analog or digital camera, or inspection optics such as an eyepiece) is intercepted by the beamsplitter 10A and a portion of the returned optical energy is passed to an optical photodetector 14. The photodetector is connected to conventional optical power measurement circuitry 16, for the purpose of optical power measurement or possibly for examination of other transmitted analog or digital content. The measurement circuitry can be part of the microscope or in close proximity to the microscope, such as in a display unit.

An example of a photodetector 14 is a Germanium or InGaAs (indium gallium arsenide) PIN (positive intrinsic negative) photodiode. However, other photodetectors could be used.

The microscope may also include an illumination source 15 to illuminate the end face of the fiber optic connector under inspection. In many microscopes, there already exists another beamsplitter 10B used to pass visible illumination from a light source through the objective lens to illuminate the end face of the fiber optic connector under inspection. However, in this invention, the light source would be momentarily disabled to avoid optical energy from it causing a measurement error. The disabling of the light source can be accomplished by various electromechanical means including mechanical switch, electronic switch, mechanical blocking mechanism or any means of removing the drive current to the source. The beamsplitter 10A added by this invention or possibly an existing beamsplitter arranged in a dual use configuration, passes the optical energy to the photodetector.

The photodetector may be fabricated from a variety of standard materials which are appropriate for the wavelengths expected on the system under test. Several possible examples would be large area InGaAs (indium gallium arsenide) or Germanium photodetectors.

Figure 2:
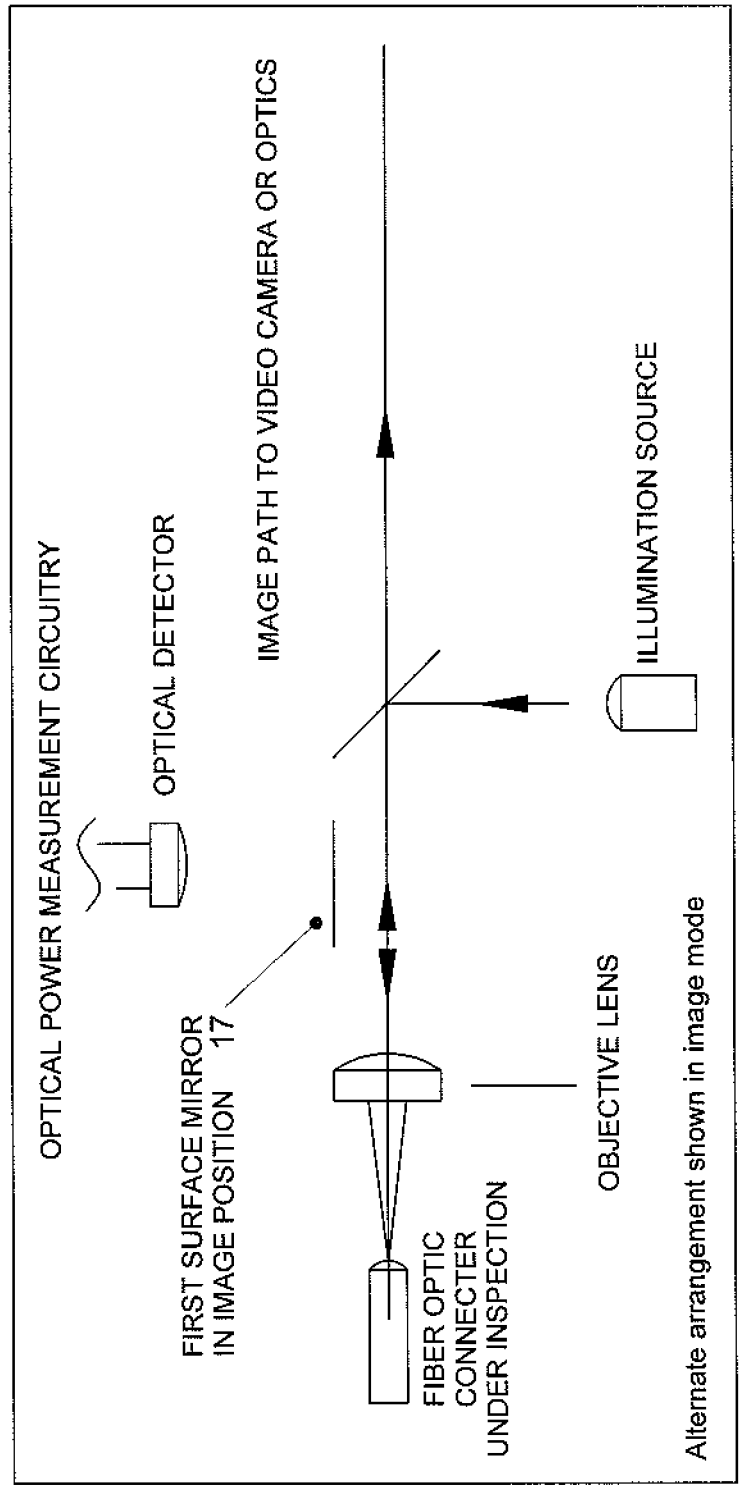
FIGS. 2 and 3 are a schematic representation of an alternative embodiment of the invention.
Figure 3:
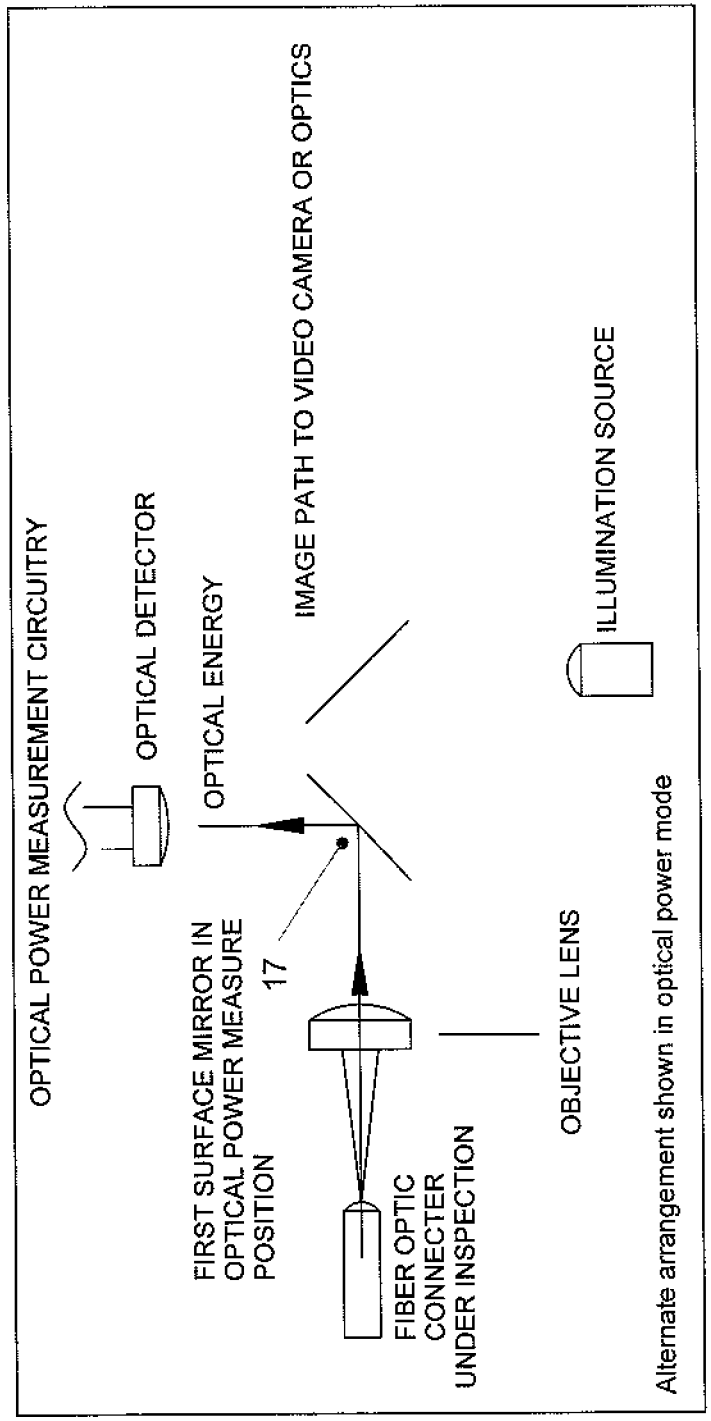

In an alternate arrangement shown in FIGS. 2 and 3, a common port is still used for inspection, but the first beamsplitter 10A is removed and the image path is moved from the photodetector to the normal imaging optics. A mirror 17 is moved to one of two positions by any electromechanical means. In image mode (FIG. 2), the mirror is moved out of the image path. In power measurement mode (FIG. 3), the mirror re-directs any optical energy from the connector being inspected to the photodetector.

There may be cost or performance issues that dictate the use of one method over the other. The image path may be moved by various means (mirror or other re-directing device along with electro-mechanical, optical or other methods) to allow it to impinge upon a photodetector or to pass to the normal imaging optics.

Advantages of the invention include reduced testing time which results in reduced cost of maintenance or installation, as well as less handling of the fiber optic connector as it no longer must be inserted into a secondary port for measurement. This reduces the risk of contamination of a clean connector.

Although a few exemplary embodiments of the present invention have been shown and described, it would be appreciated by those skilled in the art that changes may be made in this embodiment without departing from the principles and spirit of the invention, the scope of which is defined in the claims and their equivalents.

What is claimed:

1. A fiber optic inspection microscope comprising:
an objective lens;
an optical detector;
an image detector;
an illumination source;
a first beamsplitter; and
a second beamsplitter;
wherein said first beamsplitter is in a first optical path between said objective lens, said image detector and said optical detector;
wherein said first beamsplitter allows passage of an optical image to said image detector;
wherein said first beamsplitter directs optical energy to said optical detector;
wherein said second beamsplitter is in a second optical path between said illumination source and said objective lens;
wherein said second beamsplitter directs light from said illumination source to said objective lens; and
wherein said inspection microscope is connectable to an optical fiber connector and the inspection microscope is configured to perform both measuring of an optical power present on the optical fiber connector and imaging an end face of the optical fiber connector without disconnecting the inspection microscope from the optical fiber connector.

2. The microscope of claim 1, further comprising optical power measurement circuitry connected to said optical detector.

3. A fiber optic inspection microscope comprising:
an objective lens;
an optical detector;
an image detector;
an illumination source;
a movable mirror; and
a beamsplitter;
wherein said movable mirror is configured to be moved into and out of a first optical path between said objective lens, said image detector and said optical detector;
wherein said movable mirror, when it is out of said first optical path, allows passage of an optical image to said image detector;
wherein said movable mirror, when it is in said first optical path, directs optical energy to said optical detector;
wherein said beamsplitter is in a second optical path between said illumination source and said objective lens;
wherein said beamsplitter directs light from said illumination source to said objective lens; and
wherein said inspection microscope is connectable to an optical fiber connector and the inspection microscope is configured to perform both measuring of an optical power present on the optical fiber connector and imaging an end face of the optical fiber connector without disconnecting the inspection microscope from the optical fiber connector.

4. The microscope of claim 3, further comprising optical power measurement circuitry connected to said optical detector.

5. A fiber optic inspection microscope comprising:
an objective lens;
an optical detector;
an image detector;
an illumination source;
a first beamsplitter; and
a second beamsplitter;
wherein said first beamsplitter is in a first optical path between said objective lens and said image detector;
wherein said first beamsplitter is in a second optical path between said objective lens and said optical detector;
wherein said first beamsplitter allows passage of an optical image to said image detector;
wherein said first beamsplitter directs light to said optical detector;
wherein said second beamsplitter is in a third optical path between said illumination source and said objective lens;
wherein said second beamsplitter directs light from said illumination source to said objective lens; and
wherein said inspection microscope is connectable to an optical fiber connector and the inspection microscope is configured to perform both measuring of an optical power present on the optical fiber connector and imaging an end face of the optical fiber connector without disconnecting the inspection microscope from the optical fiber connector.

* * * * *